(12) United States Patent
Yui et al.

(10) Patent No.: US 9,946,256 B1
(45) Date of Patent: Apr. 17, 2018

(54) WIRELESS COMMUNICATION DEVICE FOR COMMUNICATING WITH AN UNMANNED AERIAL VEHICLE

(71) Applicant: GOPRO, INC., San Mateo, CA (US)

(72) Inventors: Stephen Yui, Pacifica, CA (US); Sean Flanigan, San Mateo, CA (US); Grant McCauley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 18 days.

(21) Appl. No.: 15/179,895

(22) Filed: Jun. 10, 2016

(51) Int. Cl.
| | |
|---|---|
| *G05D 1/00* | (2006.01) |
| *G08C 17/02* | (2006.01) |
| *B64C 39/02* | (2006.01) |
| *G06F 3/0488* | (2013.01) |
| *H04N 5/232* | (2006.01) |
| *G06F 9/445* | (2006.01) |

(52) U.S. Cl.
CPC ......... *G05D 1/0016* (2013.01); *B64C 39/024* (2013.01); *G05D 1/0038* (2013.01); *G06F 3/0488* (2013.01); *G06F 8/65* (2013.01); *G08C 17/02* (2013.01); *H04N 5/23206* (2013.01); *H04N 5/23216* (2013.01); *B64C 2201/123* (2013.01); *B64C 2201/146* (2013.01)

(58) Field of Classification Search
CPC ...... G05D 1/0016; G05D 1/0038; G06F 8/65; G06F 3/0488; H04N 5/23206; H04N 5/23216; B64C 39/024; B64C 2201/123; B64C 2201/146; G08C 17/02
USPC .............................................................. 701/2
See application file for complete search history.

(56) References Cited

U.S. PATENT DOCUMENTS

| 25,014 A | 8/1859 | Hay |
|---|---|---|
| 5,649,240 A | 7/1997 | Saegusa |

(Continued)

FOREIGN PATENT DOCUMENTS

| EP | 0583908 | 11/2000 |
|---|---|---|
| EP | 1286529 | 11/2006 |

(Continued)

OTHER PUBLICATIONS

Communication pursuant to Article 94(3) EPC for European Patent Application No. EP 13823575.9, dated Apr. 5, 2016, 4 Pages.

(Continued)

*Primary Examiner* — Brian P Sweeney
(74) *Attorney, Agent, or Firm* — Sheppard Mullin Richter & Hampton LLP

(57) ABSTRACT

A wireless communication device may include a housing, a touch sensitive display integrally included within the housing, multiple radio frequency transceivers included within the housing, multiple input mechanisms included within the housing, and a processor included within the housing. The processor may be configured to obtain visual information captured by an image capture subsystem of the unmanned aerial vehicle, display the visual information via the touch sensitive display, detect parameters of a touch on the touch sensitive display, determine a first set of inputs based upon the parameters of the touch on the touch sensitive display, receive a second set of inputs when one or more of the multiple input mechanisms are engaged, effectuate transmission, via a first radio frequency transceiver, of instructions to the unmanned aerial vehicle based upon the first set of inputs and/or the second set of inputs.

20 Claims, 5 Drawing Sheets

(56) References Cited

U.S. PATENT DOCUMENTS

| | | |
|---|---|---|
| 5,721,989 A | 2/1998 | Kitazawa |
| 5,914,941 A | 6/1999 | Janky |
| 6,341,201 B1 | 1/2002 | Ishiguro |
| 6,415,107 B1 | 7/2002 | Ogawa |
| 7,599,608 B2 | 10/2009 | Takemoto |
| 8,750,157 B1 | 6/2014 | Jagannath |
| 8,811,206 B2 | 8/2014 | Shukla |
| 8,984,143 B2 | 3/2015 | Serra |
| 8,994,800 B2 | 3/2015 | Brockway |
| 8,995,903 B2 | 3/2015 | Brockway |
| 9,036,016 B2 | 5/2015 | Brockway |
| 2002/0067412 A1 | 6/2002 | Kawai |
| 2003/0120929 A1 | 6/2003 | Hoffstein |
| 2004/0107366 A1 | 6/2004 | Balfanz |
| 2005/0036766 A1 | 2/2005 | Takemoto |
| 2005/0114716 A1 | 5/2005 | O |
| 2005/0223248 A1 | 10/2005 | Lim |
| 2006/0171388 A1 | 8/2006 | Ikeda |
| 2006/0208088 A1 | 9/2006 | Sekiguchi |
| 2007/0288331 A1 | 12/2007 | Ebrom |
| 2008/0046545 A1 | 2/2008 | Koren |
| 2008/0170569 A1 | 7/2008 | Garg |
| 2008/0232780 A1 | 9/2008 | Yamada |
| 2008/0247377 A1 | 10/2008 | Van Horn |
| 2008/0298305 A1 | 12/2008 | Nakamura |
| 2008/0310405 A1 | 12/2008 | Cox |
| 2010/0311441 A1 | 12/2010 | Hazlett |
| 2011/0019104 A1 | 1/2011 | Kwak |
| 2011/0044303 A1 | 2/2011 | Ji |
| 2011/0050926 A1 | 3/2011 | Asano |
| 2011/0063457 A1 | 3/2011 | Tokumitsu |
| 2011/0202983 A1 | 8/2011 | Pope |
| 2011/0221692 A1* | 9/2011 | Seydoux ................ A63H 27/12 345/173 |
| 2011/0307610 A1 | 12/2011 | Hayashi |
| 2012/0044354 A1 | 2/2012 | Cheng |
| 2012/0063337 A1 | 3/2012 | Shukla |
| 2012/0099572 A1 | 4/2012 | Kato |
| 2012/0106449 A1 | 5/2012 | Shibuya |
| 2012/0110031 A1 | 5/2012 | Lahcanski |
| 2012/0213134 A1 | 8/2012 | Woo |
| 2012/0232718 A1* | 9/2012 | Rischmuller .......... A63H 27/12 701/2 |
| 2012/0249802 A1 | 10/2012 | Taylor |
| 2012/0322413 A1 | 12/2012 | Haddad |
| 2012/0327225 A1 | 12/2012 | Barley |
| 2013/0076908 A1 | 3/2013 | Bratton |
| 2013/0081113 A1 | 3/2013 | Cherian |
| 2013/0120592 A1 | 5/2013 | Bednarczyk |
| 2013/0142136 A1 | 6/2013 | Pi |
| 2013/0189925 A1 | 7/2013 | Staskawicz |
| 2013/0222583 A1 | 8/2013 | Earnshaw |
| 2013/0223279 A1 | 8/2013 | Tinnakornsrisuphap |
| 2013/0337857 A1 | 12/2013 | Hassan |
| 2014/0008496 A1* | 1/2014 | Ye ............................ B64C 13/20 244/190 |
| 2014/0028435 A1 | 1/2014 | Brockway |
| 2014/0028816 A1 | 1/2014 | Brockway |
| 2014/0028817 A1 | 1/2014 | Brockway |
| 2014/0028818 A1 | 1/2014 | Brockway |
| 2014/0109184 A1 | 4/2014 | Parker, II |
| 2014/0359148 A1 | 12/2014 | Cherian |
| 2014/0376448 A1 | 12/2014 | Kao |
| 2015/0244912 A1 | 8/2015 | Chang |
| 2016/0066184 A1 | 3/2016 | Bhargav-Spantzel |
| 2016/0105644 A1 | 4/2016 | Smith |
| 2016/0117853 A1* | 4/2016 | Zhong ................... B64C 39/024 345/634 |
| 2016/0132052 A1* | 5/2016 | Seydoux .............. G05D 1/0022 701/2 |
| 2016/0294573 A1 | 10/2016 | Huang |
| 2016/0295094 A1 | 10/2016 | Endoh |
| 2016/0313732 A1* | 10/2016 | Seydoux ............ G02B 27/0172 |
| 2017/0034419 A1 | 2/2017 | Brockway |
| 2017/0068424 A1* | 3/2017 | Hong .................. G06F 3/04842 |

FOREIGN PATENT DOCUMENTS

| | | |
|---|---|---|
| EP | 1742410 | 1/2007 |
| WO | 2014144753 | 9/2014 |

OTHER PUBLICATIONS

Extended European Search Report for European Patent Application No. EP 15193305, dated Mar. 24, 2016, 9 Pages.

Extended European Search Report for European Patent Application No. EP 15193308, dated Mar. 24, 2016, 12 Pages.

Extended European Search Report for European Patent Application No. EP 15193309, dated Mar. 24, 2016, 10 Pages.

Office Action for U.S. Appl. No. 13/558,273, dated Oct. 15, 2014, 19 Pages.

PCT International Search Report and Written Opinion for PCT/US2013/051548, dated Feb. 7, 2014, 14 Pages.

Supplementary European Search Report for European Patent Application No. EP 13823575, dated Jul. 22, 2015, 8 Pages.

United States Office Action, U.S. Appl. No. 14/628,057, dated May 18, 2016, nine pages.

United States Office Action, U.S. Appl. No. 14/628,057, dated Jan. 21, 2016, 11 pages.

United States Office Action, U.S. Appl. No. 13/558,194, dated Oct. 3, 2014, 11 pages.

* cited by examiner

WIRELESS COMMUNICATION DEVICE FOR COMMUNICATING WITH AN UNMANNED AERIAL VEHICLE

FIELD

The disclosure relates to a wireless communication device for communicating flight control with an unmanned aerial vehicle that includes an image capture subsystem.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture visual information. Flight control and/or image capture may be controlled and/or manipulated by a user via a remote controller. Adjustment of flight control settings may impact various aspects of images and/or videos captured by the image sensors of the UAV.

SUMMARY

The disclosure relates to a wireless communication device configured to communicate with an unmanned aerial vehicle (UAV), multi-purpose devices, other wireless communication devices, and/or other devices in accordance with one or more implementations. The wireless communication device may include a housing, a touch sensitive display, one or more input mechanisms, a processor, a bus, an input/output (I/O) subsystem, a navigation subsystem, a power subsystem, a display subsystem, an audio/visual subsystem, a communication subsystem, an electronic storage, and/or other components. The wireless communication device may include radio frequency transceivers. The radio frequency transceivers may receive communications from the UAV and/or other devices. The radio frequency transceivers may transmit communications to the UAV and/or other devices.

The wireless communication device may be a remote controller and/or other device configured to communicate with the UAV and/or communicate with other devices. Other devices may include one or more of a computing platform, a mobile device and/or multi-purpose device (e.g., desktop computer, a laptop computer, a handheld computer, a NetBook, a Smartphone, a gaming console, and/or other computing platforms, and/or other multi-purpose device), a camera (e.g., an action camera, a sports camera, and/or other type of camera), a video recorder, and/or other device configured to communicate with the wireless communication device and/or the UAV. The wireless communication device may be configured to be handheld via the housing. The housing may be configured to support, hold, and/or carry components of the wireless communication device.

The touch sensitive display may be integrally included within the housing. The processor of the wireless communication device may be configured to effectuate presentation of a user interface via the touch sensitive display. For example, the processor may be configured to effectuate presentation of information related to configuring the wireless communication device, configuring the UAV, communicating information to the UAV, communicating information to other devices, displaying information from the UAV (e.g., one or more images captured by an image capture subsystem), displaying information from other devices, and/or presentation of other information. The touch sensitive display may be configured with capacitive and/or resistive technologies. One or more transparent conductive layers may be placed on and/or integrated with the touch sensitive display. A top surface of the touch sensitive display may be a two-dimensional plane. A user may interact with the touch sensitive display by touching the top surface of the touch sensitive display with one or more objects including one or more fingers, stylus, and/or other objects. The touch may include a pressure of the one or more objects in contact with and/or near contact with the top surface of the touch sensitive display.

The wireless communication device may include one or more input mechanisms. The one or more input mechanisms may be included within the housing. Depending on the embodiment of the wireless communication device, one or more input mechanisms may take various forms including, but not limited to, control sticks (e.g., joysticks, digital sticks, or analog sticks such as thumbsticks, which may be operable by a user's finger), buttons, switches, directional pads, sensors, levers, touchpads, and/or other forms of input mechanisms. In some embodiments, a button may include an electronic button, a mechanical button, a trigger, a shoulder button, a bumper button, and/or other buttons. A switch may include a rocker switch, a flip switch, a slide switch, and/or other switches. A directional pad may include a round directional pad or a plus-shaped directional pad. The one or more input mechanisms may be digital or analog in nature, and/or may vary in size, appearance, contour, and/or material based upon the embodiment of the wireless communication device. The one or more input mechanisms may include input mechanisms to power the wireless communication device on and/or off, arm the UAV (e.g., turn the rotors of the UAV on), disarm the UAV (e.g., turn the rotors of the UAV off), land the UAV to a surface, and/or other inputs associated with other instructions for the wireless communication device and/or the UAV.

The wireless communication device may include multiple radio frequency transceivers included within the housing. A first radio frequency transceiver included within the wireless communication device may communicate with the UAV. The first radio frequency transceiver may communicate with the UAV via a dedicated radio frequency protocol. A second radio frequency transceiver included within the wireless communication device may communicate with a network (e.g., the Internet and/or other networks). The second radio frequency transceiver may communicate with the network via a Wi-Fi protocol. A third radio frequency transceiver included within the wireless communication device may communicate with other wireless communication devices (e.g., other remote controls, etc.) and/or multi-purpose devices (e.g., desktop computer, a laptop computer, a handheld computer, a NetBook, a Smartphone, a gaming console, and/or other wireless communication devices and/or multi-purpose devices). The third radio frequency transceiver may communicate with other wireless communication devices and/or multi-purpose devices via a Wi-Fi protocol and/or Bluetooth protocol.

The processor of the wireless communication device may be configured to execute one or more computer program components via computer readable instructions. The computer program components may include one or more of a visual information component, a touch parameters component, an inputs component, a transmission component, and/or other components.

The visual information component may be configured to obtain, via the first radio frequency transceiver, visual information captured by an image capture subsystem of the UAV.

The image capture subsystem may include a gimbal. The gimbal may be configured to allow for rotation of an object about an axis. The object may include a mount for an image capturing device (e.g., a camera and/or other image capturing device). As such, the image capturing device may be adjusted via the gimbal. The image capturing device and/or the image capture subsystem may include one or more sensors and/or one or more lenses. The one or more lenses may be, for example, a wide angle lens, hemispherical, a hyper hemispherical lens that focuses light entering the lens to the one or more image sensors which may capture the visual information, and/or other lenses.

One or more sensors may include one or more image sensors. The one or more image sensors may be configured to generate an output signal conveying visual information within a field of view of the one or more image sensors. The image capture subsystem of the UAV may be configured to control one or more sensors through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

The visual information may be captured as an image, a video, a spherical image, a spherical video segment, a sound clip, and/or as other information. A spherical image and/or spherical video segment may include a 360 degree field of view in a horizontal plane and a 180 degree vertical field of view in a vertical plane.

The visual information component may be configured to display, via the touch sensitive display, the visual information obtained from the UAV, via the first radio frequency transceiver. In this manner, a user may view the visual information being captured by the image capture subsystem within the field of view of one or more sensors in real-time and/or near real-time.

The touch parameters component may be configured to detect parameters of a touch on the touch sensitive display. A user may interact with the wireless communication device via the touch sensitive display by touching a top surface of the touch sensitive display one or more objects including one or more fingers, stylus, and/or other objects. The top surface of the touch sensitive display may be a two-dimensional plane. The parameters of the touch may include a location of the touch on and/or near the top surface of the touch sensitive display, a distance of the one or more objects from the top surface of the touch sensitive display, an amount of pressure on the top surface of the touch sensitive display, a duration of time of the touch on the top surface of the touch sensitive display, a starting position of the touch and/or an ending position of the touch on the top surface of the touch sensitive display (e.g., a swiping motion), and/or other parameters. The location of the touch on and/or near the top surface of the touch sensitive display may include an x-y coordinate of the location of the touch on and/or near the top surface of the touch sensitive display.

The inputs component may be configured to determine a first set of inputs based upon the parameters of the touch on the top surface of the touch sensitive display. For example, the processor of the wireless communication device may effectuate presentation of a user interface via the touch sensitive display. The user interface may include a menu, graphics, inputs (e.g., presentation of buttons on the touch sensitive display), and/or other items. Individual graphics and/or inputs displayed on the touch sensitive display may be associated with individual regions and/or locations. An individual region and/or location may include dimensions of the region and/or location (e.g., 106 px wide, 80 px high). An individual region and/or location may include x-y coordinates on an x-y plane. If the touch parameters component detects that the touch on the touch sensitive display is located at the same and/or approximate region on the x-y plane as a particular input displayed on the touch sensitive display, the inputs component may be configured to determine the first set of inputs to include the input associated with the location and/or duration of the touch on the touch sensitive display.

The inputs component may be configured to determine a second set of inputs when one or more of the multiple input mechanisms are engaged. Individual input mechanisms may be associated with various inputs and/or controls for the wireless communication device and/or the UAV when engaged in various positions. For example, one of the multiple input mechanisms may include a button. Engaging the button for less than a second may represent one input (e.g., an input to arm the UAV), while engaging the button for more than a second may represent a second input (e.g., an input to initialize automatic takeoff of the UAV). One or more of the multiple input mechanisms may include a joystick button. Engaging the joystick in an upward position may indicate an input of rotating the gimbal of the UAV upward.

The transmission component may be configured to effectuate transmission, via the first radio frequency transceiver, of instructions to the UAV based upon the first set of inputs and/or the second set of inputs. The instructions may be configured to adjust flight controls and/or adjust the image capture subsystem of the UAV. The transmission component may be configured to effectuate transmission, via the first radio frequency transceiver, of instructions including the first set of inputs and/or the second set of inputs to the UAV in real-time or near real-time to the inputs component determining and/or receiving the first set of inputs and/or the second set of inputs.

The instructions may be configured to adjust flight controls of the UAV. Instructions being configured to adjust flight controls may include instructions to adjust one or more of an altitude, a longitude, a latitude, a geographical location, a heading, a speed, and/or other flight controls of the UAV. As such, a user may adjust and/or control the UAV via the wireless communication device in any manner based upon various inputs via the touch sensitive display and/or one or more of the multiple input mechanisms.

The instructions may be configured to adjust the image capture subsystem of the UAV. Instructions being configured to adjust the image capture subsystem may include instructions to adjust a gimbal, one or more of an aperture timing, an exposure, a focal length, an angle of view, a depth of view, a focus, a light metering, a white balance, a resolution, a frame rate, an object of focus, a capture angle, a zoom parameter, a video format, a sound parameter, a compression parameter, and/or other aspects of the image capture subsystem. The image capture subsystem may be configured to control one or more sensors such that the visual information captured by one or more image sensors may include an image and/or video segment of a particular object, user, and/or landscape. As such, a user may adjust and/or control the image capture subsystem of the UAV via the wireless communication device in any manner based upon various inputs via the touch sensitive display and/or one or more of the multiple input mechanisms.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
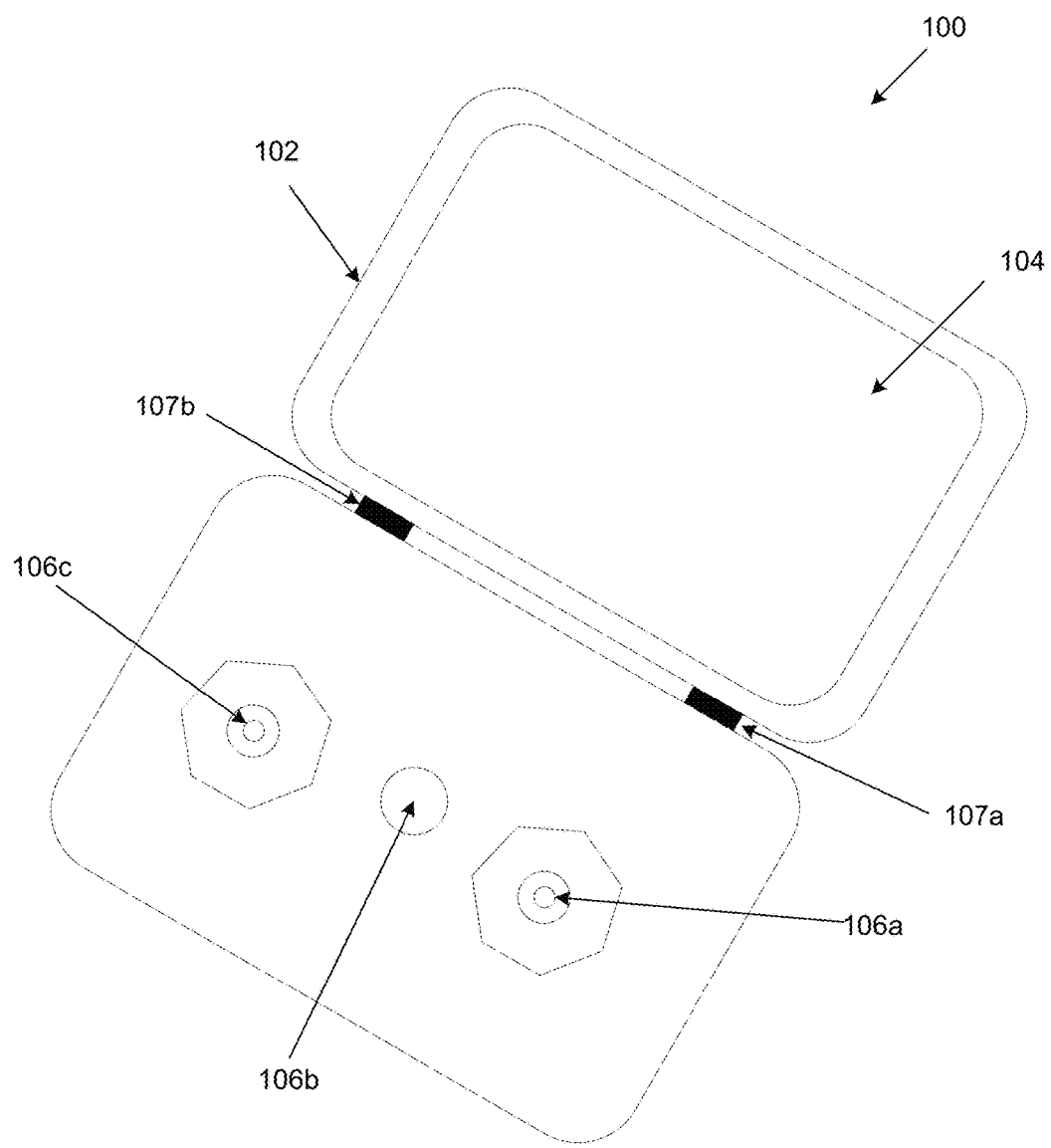
FIG. 1 illustrates a wireless communication device, in accordance with one or more implementations.
Figure 2:
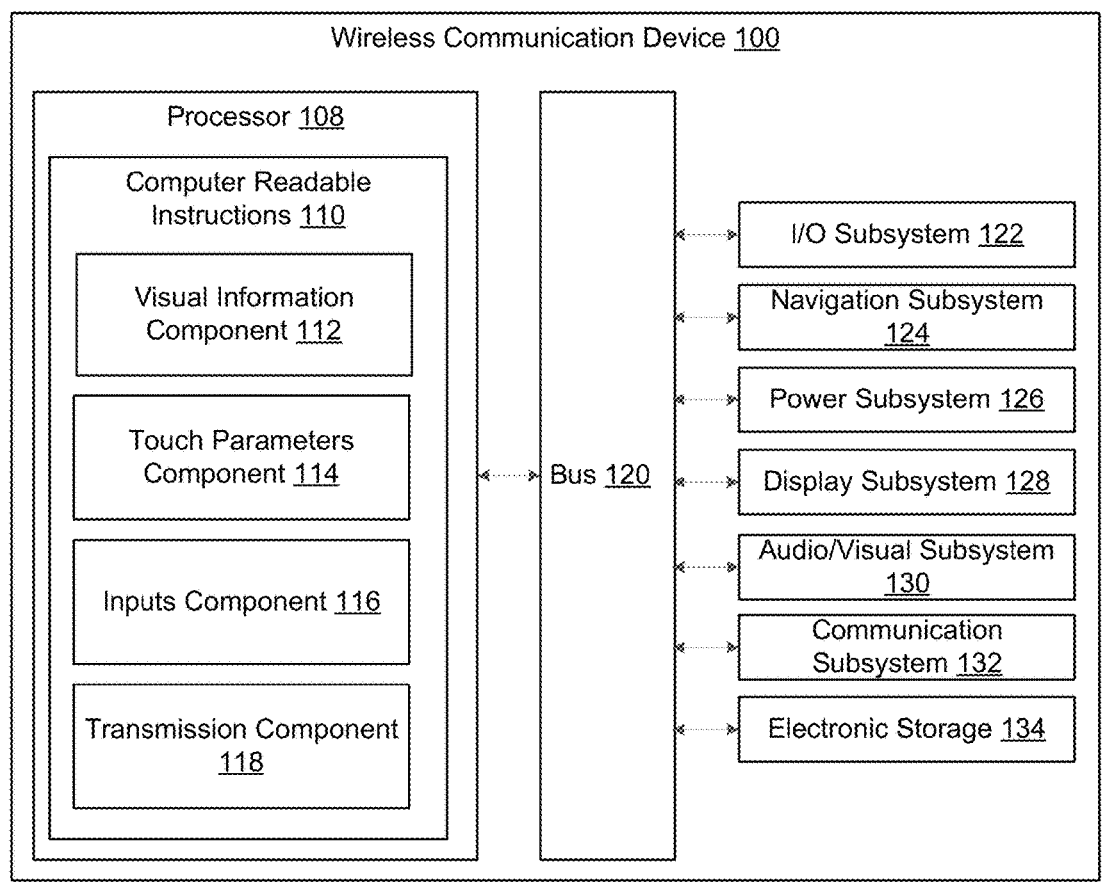
FIG. 2 illustrates a wireless communication device configured to communicate with an unmanned aerial vehicle, in accordance with one or more implementations.

FIGS. 1 and 2 illustrate a wireless communication device 100 configured to communicate with an unmanned aerial vehicle (UAV), multi-purpose devices, other wireless communication devices, and/or other devices in accordance with one or more implementations. Wireless communication device 100 may include housing 102, touch sensitive display 104, one or more input mechanisms (e.g., input mechanisms 106a, 106b, and/or 106c), processor 108, bus 120, I/O subsystem 122, navigation subsystem 124, power subsystem 126, display subsystem 128, audio/visual subsystem 130, communication subsystem 132, electronic storage 134, and/or other components. Wireless communication device 100 may include radio frequency transceivers (e.g., included within I/O subsystem 122, communication subsystem 132, and/or other components) included within housing 102. The radio frequency transceivers may receive communications from an UAV and/or other devices. The radio frequency transceivers may transmit communications to the UAV and/or other devices. Individual components may be located external to wireless communication device 100, in which case, wireless communication device 100 may receive information from the externally located components.

Wireless communication device 100 may be a remote controller and/or other device configured to communicate with the UAV and/or communicate with other devices. Other devices may include one or more of a computing platform, a mobile device and/or multi-purpose device (e.g., desktop computer, a laptop computer, a handheld computer, a NetBook, a Smartphone, a gaming console, and/or other computing platforms, and/or other multi-purpose device), a camera (e.g., an action camera, a sports camera, and/or other type of camera), a video recorder, and/or other device configured to communicate with wireless communication device 100 and/or the UAV. Wireless communication device 100 may be configured to be handheld via housing 102. Housing 102 may be configured to support, hold, and/or carry components of wireless communication device 100.

Touch sensitive display 104 may be integrally included within the housing. Processor 108 may be configured to effectuate presentation of a user interface (not shown) via touch sensitive display 104. For example, processor 108 may be configured to effectuate presentation of information related to configuring wireless communication device 100, configuring the UAV, communicating information to the UAV, communicating information to other devices, displaying information from the UAV (e.g., one or more images captured by an image capture subsystem, as will be discussed in further detail below), displaying information from other devices, and/or presentation of other information. Touch sensitive display 104 may include a bright display suitable for outdoor use in bright sunlight. Touch sensitive display 104 may be a liquid crystal display (LCD), a light emitting diode (LED) display, an organic LED (OLED) display, a plasma screen, and/or other displays. Touch sensitive display 104 may be configured with capacitive and/or resistive technologies. One or more transparent conductive layers (not shown) may be placed on and/or integrated with touch sensitive display 104. A top surface of touch sensitive display 104 may be a two-dimensional plane. A user may interact with touch sensitive display 104 by touching the top surface of touch sensitive display 104 with one or more objects including one or more fingers, stylus, and/or other objects. The touch may include a pressure of the one or more objects in contact with and/or near contact with the top surface of touch sensitive display 104.

As will be discussed in further detail below, processor 108 may be configured to detect parameters of the touch on the top surface of touch sensitive display 104. The parameters of the touch may include a location of the touch on and/or near the top surface of touch sensitive display 104, a distance of the one or more objects from the top surface of touch sensitive display 104, an amount of pressure on the top surface of touch sensitive display 104, a duration of time of the touch on the top surface of touch sensitive display 104, a starting position of the touch and/or an ending position of the touch on the top surface of touch sensitive display 104 (e.g., a swiping motion), and/or other parameters. The location of the touch on and/or near the top surface of touch sensitive display 104 may include an x-y coordinate of the location of the touch on and/or near the top surface of touch sensitive display.

Wireless communication device 100 may include one or more input mechanisms (e.g., input mechanisms 106a, 106b, and/or 106c). The one or more input mechanisms may be included within housing 102. Depending on the embodiment of wireless communication device 100, one or more input mechanisms may take various forms including, but not limited to, control sticks (e.g., joysticks, digital sticks, or analog sticks such as thumbsticks, which may be operable by a user's finger), buttons, switches, directional pads, sensors, levers, touchpads, and/or other forms of input mechanisms. In some embodiments, a button may include an electronic button, a mechanical button, a trigger, a shoulder button, a bumper button, and/or other buttons. A switch may include a rocker switch, a flip switch, a slide switch, and/or other switches. A directional pad may include a round directional pad or a plus-shaped directional pad. The one or more input mechanisms may be digital or analog in nature, and/or may vary in size, appearance, contour, and/or material based upon the embodiment of wireless communication device 100. The one or more input mechanisms may include input mechanisms to power wireless communication device 100 on and/or off, arm the UAV (e.g., turn the rotors of the UAV on), disarm the UAV (e.g., turn the rotors of the UAV off), land the UAV to a surface, and/or other inputs associated with other instructions.

Housing 102 may include one or more portions. If housing 102 includes a single portion, touch sensitive display 102 may be integrally included within the single portion of housing 102. If housing 102 includes more than one portion, touch sensitive display 102 may be integrally included within one of the multiple portions of housing 102. For example and referring to FIG. 1, touch sensitive display 102 may be integrally included within one portion of housing 102 while input mechanisms 106a, 106b, and 106c may be included within a different and/or separate portion of housing 102. The different and/or separate portions of housing 102 may be integrally connected via one or more hinges (e.g., one or more hinges 107a, 107b) allowing for the separate portions of housing 102 to pivot in one or more directions relative to one another. For example, housing 102 may open via one or more hinges 107a, 107b and/or close via one or more hinges 107a, 107b. In an embodiment, touch sensitive display 104 and/or input mechanisms 106a, 106b, and/or 106c may not be exposed and/or accessible when housing 102 is closed. Wireless communication device 100 as shown in FIG. 1 is for illustrative purposes only, as other embodiments of wireless communication device 100 may be configured in various shapes and/or sizes. For example, multiple touch sensitive displays may be integrally included within housing 102.

Referring to FIGS. 1 and 2, I/O subsystem 122 may include input and/or output interfaces and/or electronic couplings to interface with devices that allow for transfer of information into or out of wireless communication device 100. For example, I/O subsystem 122 may be a physical interface such as a universal serial bus (USB) or a media card (e.g., secure digital (SD)) slot.

I/O subsystem 122 may be associated with communication subsystem 132 to include multiple radio frequency transceivers. Individual radio frequency transceivers may be used to transmit and/or receive radio signals between individual devices. For example, communication subsystem 132 may include one or more wireless communication mechanisms such as Wi-Fi (short range and/or long range), long term evolution (LTE), 3G/4G/5G, and/or other wireless communication mechanisms. Communication subsystem 132 may include wired communication mechanisms such as Ethernet, USB, HDMI, and/or other wired communication mechanisms.

A first radio frequency transceiver included within wireless communication device 100 may communicate with the UAV. The first radio frequency transceiver may communicate with the UAV via a dedicated radio frequency protocol. A second radio frequency transceiver included within wireless communication device 100 may communicate with a network (e.g., the Internet and/or other networks). The second radio frequency transceiver may communicate with the network via a Wi-Fi protocol. A third radio frequency transceiver included within wireless communication device 100 may communicate with other wireless communication devices (e.g., other remote controls, etc.) and/or multi-purpose devices (e.g., desktop computer, a laptop computer, a handheld computer, a NetBook, a Smartphone, a gaming console, and/or other wireless communication devices and/or multi-purpose devices). The third radio frequency transceiver may communicate with other wireless communication devices and/or multi-purpose devices via a Wi-Fi protocol and/or Bluetooth protocol.

Navigation subsystem 124 may include electronics, controls, and/or interfaces for navigation associated with wireless communication device 100. Navigation subsystem 124 may include, for example, a global position system (GPS) and/or a compass. The GPS and/or the compass may be used to track a current location of wireless communication device 100. The location of wireless communication device 100 may be relative to a location of the UAV.

Power subsystem 126 may include electronics, controls, and/or interfaces for providing power to wireless communication device 100. Power subsystem 126 may include direct current (DC) power sources (e.g., batteries). Power subsystem 126 may be configured for alternating current (AC) power sources. Power subsystem 126 may include power management processes for extending DC power source lifespan. In some embodiments, power subsystem 126 may be comprised of power management integrated circuit and a low power microprocessor for power regulation. The microprocessor in such embodiments may be configured to provide low power states to preserve battery life, an ability to wake from low power states via engagement of one or more input mechanisms 106a, 106b, and/or 106c of wireless communication device 100, and/or other power-related functionalities of wireless communication device 100.

Display subsystem 128 may be configured to provide one or more interfaces, electronics, and/or display drivers for touch sensitive display 104 integrally included within housing 102 of wireless communication device 100.

Audio/visual subsystem 130 may include interfaces, electronics, and/or drivers for an audio output (e.g., headphone jack, speakers, etc.). Audio/visual subsystem 130 may include interfaces, electronics, and/or drivers for visual indicators (e.g., LED lighting associated with one or more input mechanisms 106a, 106b, and/or 106c, etc.).

Electronic storage 134 may include electronic storage media that electronically stores information. Electronic storage 134 may store software algorithms, information determined, obtained, and/or processed by processor 108, user preferences for wireless communication device 100, user preferences for the UAV, visual information obtained and/or received from an image capture subsystem of the UAV (as will be discussed in further detail below), information received from one or more other wireless communication devices and/or multi-purpose devices, information received remotely, and/or other information that enables wireless communication device 100 to function properly.

The electronic storage media of electronic storage 134 may include one or both of storage that is provided integrally (i.e., substantially non-removable) with wireless communication device 100 and/or removable storage that is removably connectable to wireless communication device 100 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 134 may include one or more virtual storage resources (e.g., cloud storage, a virtual private network, and/or other virtual storage resources).

Processor 108 may be configured to provide information processing capabilities within wireless communication device 100. As such, processor 108 may include one or more of a digital processor, an analog processor, a digital circuit designed to process information, a central processing unit, a graphics processing unit, a microcontroller, an analog circuit designed to process information, a state machine, and/or other mechanisms for electronically processing information. For example, a microcontroller may be one or more of 8051, PIC, AVR, and ARM microcontroller. In some implementations, processor 108 may include multiple processing units. In some implementations, processor 108 may be coupled with one or more of RAM, ROM, input/output ports, and/or other peripherals.

Processor 108 may be configured to execute one or more computer program components via computer readable instructions 110. The computer program components may include one or more of visual information component 112, touch parameters component 114, inputs component 116, transmission component 118, and/or other components.

Figure 3:
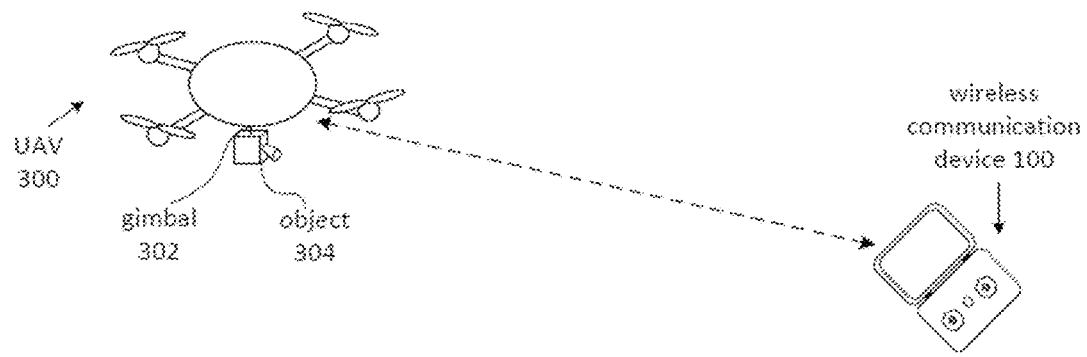
FIG. 3 illustrates a wireless communication device in communication with an unmanned aerial vehicle, in accordance with one or more implementations.

Referring to FIG. 3, UAV is shown in communication with wireless communication device 100. Wireless communication device 100 may communicate with, guide, and/or control UAV 300.

Figure 4:
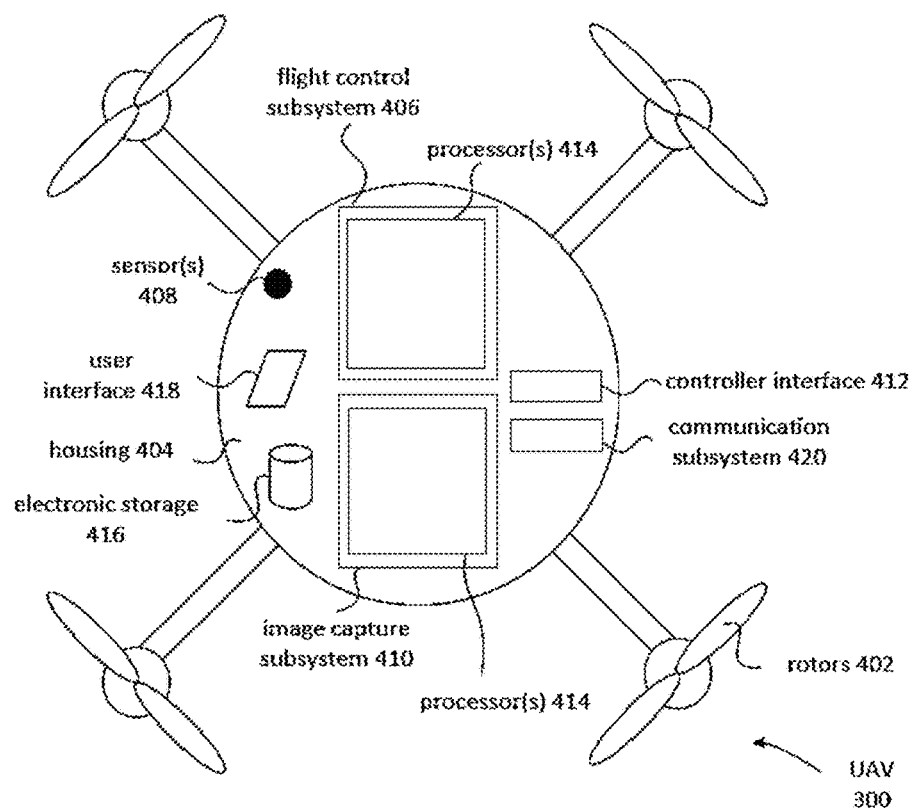
FIG. 4 illustrates an unmanned aerial vehicle, in accordance with one or more implementations.
Figure 5:
FIG. 5 illustrates an exemplary depiction of a user interface, in accordance with one or more implementations.

Referring to FIG. 4, UAV 300 is illustrated. While UAV 300 is shown as a quadcopter, this is for exemplary purposes only and is not meant to be a limitation of this disclosure. As illustrated in FIG. 4, UAV 300 may include four rotors 402. The number of rotors of UAV 300 is not meant to be limiting in anyway, as UAV 300 may include any number of rotors. UAV 300 may include one or more of housing 404, flight control subsystem 406, one or more sensors 408, image capture subsystem 410, controller interface 412, one or more physical processors 414, electronic storage 416, user interface 418, communication subsystem 420, and/or other components. Housing 404 may be configured to support, hold, and/or carry UAV 300 and/or components thereof.

Referring to FIGS. 2-4, visual information component 112 may be configured to obtain, via the first radio frequency transceiver, visual information captured by image capture subsystem 410 of UAV 300. Image capture subsystem 410 may include gimbal 302. Gimbal 302 may be configured to allow for rotation of object 304 about an axis. Object 304 may include a mount for an image capturing device (e.g., a camera and/or other image capturing device). As such, the image capturing device may be adjusted via gimbal 302. The image capturing device and/or image capture subsystem 410 may include one or more sensors 408 and/or one or more lenses. The one or more lenses may be, for example, a wide angle lens, hemispherical, a hyper hemispherical lens that focuses light entering the lens to the one or more image sensors which may capture the visual information, and/or other lenses.

Image capture subsystem 410 may include one or more processor(s) 414 and/or other components. While single sensor 408 is depicted in FIG. 4, this is not meant to be limiting in any way. UAV 300 may include any number of sensors 408. One or more sensors 408 may include one or more image sensors. The one or more image sensors may be configured to generate an output signal conveying visual information within a field of view of the one or more image sensors. Image capture subsystem 410 may be configured to control one or more sensors 408 through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

The visual information may be captured as an image, a video, a spherical image, a spherical video segment, a sound clip, and/or as other information. A spherical image and/or spherical video segment may include a 360 degree field of view in a horizontal plane and a 180 degree vertical field of view in a vertical plane. One or more sensors 408 may capture high-definition images having a resolution of, for example, 720p, 1080p, 4 k, or higher. In one embodiment, a spherical video segment may be captured as a 5760 pixels by 2880 pixels with a 360 degree horizontal field of view and a 180 degree vertical field of view. One or more sensors 408 may capture a video segment at frame rates of, for example, 30 frames per second, 60 frames per second, or higher.

One or more sensors 408 may be configured to capture contextual information associated with capture of the visual information. Contextual information may define one or more temporal attributes and/or spatial attributes associated with capture of the visual information. Contextual information may include any information pertaining to an environment in which the visual information. Contextual information may include visual and/or audio information based upon the environment in which the visual information was captured. Temporal attributes may define a time in which the visual information was captured (e.g., date, time, time of year, season, etc.). Spatial attributes may define the environment in which the visual information was captured (e.g., location, landscape, weather, surrounding activities, etc.). The one or more temporal attributes and/or spatial attributes may include one or more of a geolocation attribute, a time attribute, a date attribute, a content attribute, and/or other attributes.

A geolocation attribute may include a physical location of where the visual information was captured. The geolocation attribute may correspond to one or more of a compass heading, one or more physical locations of where the visual information was captured, a pressure at the one or more physical locations, a depth at the one or more physical locations, a temperature at the one or more physical locations, and/or other information. For example, one or more sensors 408 may include a global positioning system (GPS), an altimeter, an accelerometer, a gyroscope, a magnetometer, and/or other sensors. Examples of the geolocation attribute may include the name of a country, region, city, a zip code, a longitude and/or latitude, and/or other information relating to a physical location where the visual information was captured.

A time attribute may correspond to a one or more timestamps associated with when the visual information was captured. Examples of the time attribute may include a time local to the physical location (which may be based upon the geolocation attribute) of when the visual information was captured, the time zone associated with the physical location, and/or other information relating to a time when the visual information was captured.

A date attribute may correspond to a one or more of a date associated with when the visual information was captured, seasonal information associated with when the visual information was captured, and/or a time of year associated with when the visual information was captured.

A content attribute may correspond to one or more of an action depicted within the visual information, one or more objects depicted within the visual information, and/or a landscape depicted within the visual information. For example, the content attribute may include a particular action (e.g., running), object (e.g., a building), and/or landscape (e.g., beach) portrayed and/or depicted in the visual information. One or more of an action depicted within the visual information may include one or more of sport related actions, inactions, motions of an object, and/or other actions. One or more of an object depicted within the visual information may include one or more of a static object (e.g., a building), a moving object (e.g., a moving train), a particular actor (e.g., a body), a particular face, and/or other objects. A landscape depicted within the visual information may include scenery such as a desert, a beach, a concert venue, a sports arena, etc. Content of the visual information be determined based upon object detection of content included within the visual information.

Flight control subsystem 406 may be configured to provide flight control for UAV 300. Flight control subsystem 406 may include one or more physical processors 414 and/or other components. Operation of flight control subsystem 406 may be based on flight control settings and/or flight control information. Flight control information may be based on information and/or parameters determined and/or obtained to control UAV 300. In some implementations, providing flight control settings may include functions including, but not limited to, flying UAV 300 in a stable manner, tracking people or objects, avoiding collisions, and/or other functions useful for autonomously flying UAV 300. Flight control information may be transmitted by a remote controller (e.g., wireless communication device 100). In some implementations, flight control information and/or flight control settings may be received by controller interface 412.

User interface 418 of UAV 300 may be configured to provide an interface between UAV 300 and a user (e.g. a remote user using a graphical user interface displayed via touch sensitive display 104 of wireless communication device 100) through which the user may provide information to and receive information from UAV 300. This may enable data, results, and/or instructions and any other communicable items to be communicated between the user and UAV 300, such as flight control settings and/or image capture controls. Examples of interface devices suitable for inclusion in user interface 418 may include a keypad, buttons, switches, a keyboard, knobs, levers, a display screen, a touch screen, speakers, a microphone, an indicator light, an audible alarm, a printer, and/or other devices. Information may be provided to a user (e.g., via wireless communication device 100) by user interface 318 in the form of auditory signals, visual signals, tactile signals, and/or other sensory signals.

It is to be understood that other communication techniques, either hard-wired or wireless, may be contemplated herein as user interface 418. For example, in one embodiment, user interface 418 may be integrated with a removable storage interface provided by electronic storage 416. In this example, information may be loaded into UAV 300 from removable storage (e.g., a smart card, a flash drive, a removable disk, etc.) that may enable a user to customize UAV 300 via wireless communication device 100. Other exemplary input devices and/or techniques adapted for use with UAV 300 as user interface 418 may include, but are not limited to, an RS-232 port, RF link, an IR link, modem (telephone, cable, Ethernet, internet or other).

Communication subsystem 420 may include multiple radio frequency transceivers. Individual radio frequency transceivers may be used to transmit and/or receive radio signals between individual devices. For example, communication subsystem 420 may include one or more wireless communication mechanisms such as Wi-Fi (short range and/or long range), long term evolution (LTE), 3G/4G/5G, and/or other wireless communication mechanisms. While not shown, communication subsystem 420 may include wired communication mechanisms such as Ethernet, USB, HDMI, and/or other wired communication mechanisms.

A first radio frequency transceiver included within UAV 300 may communicate with wireless communication device 100. The first radio frequency transceiver may communicate with wireless communication device 100 via a dedicated radio frequency protocol. A second radio frequency transceiver included within UAV 300 may communicate with a network (e.g., the Internet and/or other networks). The second radio frequency transceiver may communicate with the network via a Wi-Fi (e.g., short range and/or long range) protocol. Other radio frequency transceivers may be included within UAV 300.

Referring to FIGS. 1-4, visual information component 112 may be configured to display, via touch sensitive display 104, the visual information obtained from UAV 300, via the first radio frequency transceiver. In this manner, a user may view the visual information being captured by image capture subsystem 410 of UAV 300 within the field of view of one or more sensors 408. For example, if UAV 300 is hovering over a snowboarder, the user may view the snowboarder and/or surrounding areas via touch sensitive display 104 as the visual information is obtained, via the first radio frequency transceiver, in real-time and/or near real-time.

Touch parameters component 114 may be configured to detect parameters of a touch on touch sensitive display 104. As discussed above, touch sensitive display 104 may be configured with capacitive and/or resistive technologies. A user may interact with touch sensitive display 104 by touching a top surface of touch sensitive display 104 with one or more objects including one or more fingers, stylus, and/or other objects. The top surface of touch sensitive display 104 may be a two-dimensional plane. The parameters of the touch may include a location of the touch on and/or near the top surface of touch sensitive display 104, a distance of the one or more objects from the top surface of touch sensitive display 104, an amount of pressure on the top surface of touch sensitive display 104, a duration of time of the touch on the top surface of touch sensitive display 104, a starting position of the touch and/or an ending position of the touch on the top surface of touch sensitive display 104 (e.g., a swiping motion), and/or other parameters.

The location of the touch on and/or near the top surface of touch sensitive display 104 may include an x-y coordinate of the location of the touch on and/or near the top surface of touch sensitive display 104. For example, touch parameters component 114 may be configured to detect that the touch on touch sensitive display 104 was located at x-y coordinates of (140, 280) from a defined origin point of (0, 0) and lasted 0.2 seconds. In this manner, touch parameters component may be configured to detect that the touch was a tap. Touch parameters component 114 may be configured to detect that the touch on the touch sensitive display was located at x-y coordinates of (250, 860) from a defined origin point of (0, 0) and lasted 2.0 seconds. Touch parameters component 114 may be configured to detect that the touch on the touch sensitive display began at x-y coordinates of (1280, 640) from a defined origin point of (0, 0) and ended at (1280, 840). In this manner, touch parameters component 114 may be configured to detect that the touch was a swiping motion.

Inputs component 116 may be configured to determine a first set of inputs based upon the parameters of the touch on the top surface of touch sensitive display 104. For example, processor 108 may effectuate presentation of a user interface via touch sensitive display 104. The user interface may include a menu, graphics, inputs (e.g., presentation of buttons on touch sensitive display 104), and/or other items.

Individual graphics and/or inputs displayed on touch sensitive display 104 may be associated with individual regions and/or locations. An individual region and/or location may include dimensions of the region and/or location (e.g., 106 px wide, 80 px high). An individual region and/or location may include x-y coordinates on an x-y plane (e.g., 106, 80). The input associated with the region with x-y coordinates of (106, 80) from a defined origin point of (0, 0) may indicate, for example, a record input (e.g., begin recording capture of the visual information). If touch parameters component 114 detects that the touch on touch sensitive display 104 is located at the same and/or approximate region on the x-y plane as a particular input displayed on touch sensitive display 104 (e.g., x-y coordinates of (106, 80)), inputs component 116 may be configured to determine the first set of inputs to include the record input based upon the input associated with the location and/or duration of the touch on touch sensitive display 104.

Inputs component 116 may be configured to determine a second set of inputs when one or more of the multiple input mechanisms (e.g., one or more of input mechanisms 106a, 106b, and/or 106c of FIG. 1) are engaged. Individual input mechanisms (e.g., one or more of input mechanisms 106a, 106b, and/or 106c of FIG. 1) may be associated with various inputs and/or controls for wireless communication device 100 of FIG. 1 and/or UAV 300 of FIG. 4 when engaged in various positions. For example, one of the multiple input mechanisms may include a button (e.g., input mechanism 106b). Engaging the button for less than a second may represent one input (e.g., an input to arm UAV 300), while engaging the button for more than a second may represent a second input (e.g., an input to initialize automatic takeoff of UAV 300). One or more of the multiple input mechanisms may include a joystick button (e.g., input mechanisms 106a and/or 106c). Engaging the joystick in an upward position may indicate an input of rotating the gimbal of UAV of 300 upward. In this manner, inputs component 116 may be configured to determine the second set of inputs to include the rotating upward input. Engaging the joystick in a downward position may indicate an input of rotating the gimbal of UAV of 300 downward. In this manner, inputs component 116 may be configured to determine the second set of inputs to include the rotating downward input. This is not meant to be a limitation of this disclosure, as individual input mechanisms may provide different inputs based upon an embodiment of wireless communication device 100.

Transmission component 118 may be configured to effectuate transmission, via the first radio frequency transceiver, of instructions to UAV 300 based upon the first set of inputs and/or the second set of inputs. The instructions may be configured to adjust flight controls and/or adjust image capture subsystem 410 of UAV 300. As discussed above with reference to inputs component 116, the first set of inputs and/or the second set of inputs may include inputs to control various aspects of wireless communication device 100 and/or UAV 300. Transmission component 118 may be configured to effectuate transmission, via the first radio frequency transceiver, of instructions including the first set of inputs and/or the second set of inputs to UAV 300 in real-time or near real-time to inputs component 116 determining and/or receiving the first set of inputs and/or the second set of inputs.

The instructions may be configured to adjust flight controls of UAV 300. Instructions being configured to adjust flight controls may include instructions to adjust one or more of an altitude, a longitude, a latitude, a geographical location, a heading, a speed, and/or other flight controls of UAV 300. Flight control of UAV 300 may be based upon a position of UAV 300. The position of UAV 300 may impact capture of the visual information. For example, an altitude in which UAV 300 is flying and/or hovering may impact the visual information captured by an image sensor (e.g., the visual information may be captured at different angles based upon the altitude of UAV 300). A speed and/or direction in which UAV 300 is traveling may capture different visual information. As such, a user may adjust and/or control UAV 300 via wireless communication device 100 in any manner based upon various inputs via touch sensitive display 104 and/or input mechanisms 106a, 106b, and/or 106c.

The instructions may be configured to adjust image capture subsystem 410 of UAV 300. Instructions being configured to adjust image capture subsystem 410 may include instructions to adjust a gimbal, one or more of an aperture timing, an exposure, a focal length, an angle of view, a depth of view, a focus, a light metering, a white balance, a resolution, a frame rate, an object of focus, a capture angle, a zoom parameter, a video format, a sound parameter, a compression parameter, and/or other aspects of image capture subsystem 410. Image capture subsystem 410 may be configured to control one or more sensors 408 such that the visual information captured by one or more image sensors of one or more sensors 408 may include an image and/or video segment of a particular object, user, and/or landscape. As such, a user may adjust and/or control image capture subsystem 410 of UAV 300 via wireless communication device 100 in any manner based upon various inputs via touch sensitive display 104 and/or input mechanisms 106a, 106b, and/or 106c.

Transmission component 118 may be configured to effectuate transmission, via the third radio frequency, of information to other wireless communication devices and/or multi-purpose devices based upon the first set of inputs and/or the second set of inputs in a similar manner as discussed above. For example, if the first set of inputs (e.g., a touch on touch sensitive display 104 and/or engagement of one or more of input mechanisms 106a, 106b, and/or 106c) included an input to connect, via the third radio frequency (e.g., via a Bluetooth protocol and/or a Wi-Fi protocol), to a multi-purpose device (e.g., a smartphone or other multi-purpose device), transmission component 118 may be configured to effectuate transmission of connection information to the multi-purpose device. Upon connection, processor 108 may be configured to, for example, effectuate transmission, via the third radio frequency transceiver, of the visual information to the multi-purpose device such that the visual information may be displayed on a display associated with the multi-purpose device.

Processor 108 may be configured to receive, via the second radio frequency (e.g., via a Wi-Fi protocol), one or more updates for the wireless communication device and/or UAV 300. The one or more updates may include an update to one or more versions of components of wireless communication device 100 (e.g., processor 108 and/or other components) and/or one or more versions of components of UAV 300 (e.g., one or more processor(s) 414). Processor 108 may be configured to effectuate presentation, via touch sensitive display 104, of a notification that one or more updates may be available for download. The one or more updates may include a version number, a date of the one or more updates, which components of wireless communication device 100 and/or UAV 300 may be affected by the one or more updates, and/or other information.

Processor 108 may be configured to receive, via a touch detected on touch sensitive display 104 and/or engagement of one or more input mechanisms 106a, 106b, and/or 106c, an update input indicating processor 108 to download the one or more updates via the second radio frequency transceiver (e.g., via a Wi-Fi protocol). The one or more updates may be downloaded from a network, such as the Internet, a remote server, and/or other location accessible via the second radio frequency transceiver.

Referring to FIGS. 1-5, processor 108 may be configured to effectuate presentation, via touch sensitive display 104, of a notification to install the one or more downloaded updates to wireless communication device 100 (e.g., "Controller"), UAV 300 (e.g., "Drone"), and/or image capturing subsystem 410 (e.g., "Stabilizer and Camera"). Processor 108 may be configured to receive, via a touch detected on touch sensitive display 104 on and/or near "INSTALL" button 500 and/or engagement of one or more input mechanisms 106a, 106b, and/or 106c, an install input indicating processor 108 to update wireless communication device 100 with the one or more updates and/or effectuate transmission, via the first radio frequency transceiver, of the one or more updates to UAV 300.

In some implementations, wireless communication device 100 may be operatively linked, via one or more electronic communication links, to one or more servers, one or more client computing platforms (e.g., multi-purpose devices and/or other client computing platforms), and/or external resources. For example, such electronic communication links may be established, at least in part, via a network such as the Internet and/or other networks. It will be appreciated that this is not intended to be limiting, and that the scope of this disclosure includes implementations in which servers, client computing platforms, and/or external resources may be operatively linked via some other communication media.

External resources may include sources of information, hosts and/or providers of virtual environments outside of wireless communication device 100, external entities participating with wireless communication device 100, and/or other resources. In some implementations, some or all of the functionality attributed herein to external resources may be provided by resources included in wireless communication device 100.

Wireless communication device 100 may include communication lines, or ports to enable the exchange of information with a network and/or other computing platforms. Illustration of wireless communication device 100 in FIGS. 1 and/or 2 are not intended to be limiting. Wireless communication device 100 may include a plurality of hardware, software, and/or firmware components operating together to provide the functionality attributed herein to wireless communication device 100. For example, processor 108 may be implemented by a cloud of computing platforms operating together as processor 108.

Processor 108 may be configured to provide information processing capabilities in wireless communication device 100. As such, processor 108 may include one or more of a digital processor, an analog processor, a digital circuit designed to process information, an analog circuit designed to process information, a state machine, and/or other mechanisms for electronically processing information. Although processor 108 is shown in FIG. 2 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute computer readable instruction components 112, 114, 116, and/or 118, and/or other components. The processor 108 may be configured to execute components 112, 114, 116, 118, and/or other components by software, hardware, firmware, some combination of software, hardware, and/or firmware, and/or other mechanisms for configuring processing capabilities on processor 108.

It should be appreciated that although components 112, 114, 116, and 118 are illustrated in FIG. 2 as being co-located within a single processing unit, in implementations in which processor 108 includes multiple processing units, one or more of components 112, 114, 116, and/or 118 may be located remotely from the other components. The description of the functionality provided by the different components 112, 114, 116, and/or 118 described herein is for illustrative purposes, and is not intended to be limiting, as any of components 112, 114, 116, and/or 118 may provide more or less functionality than is described. For example, one or more of components 112, 114, 116, and/or 118 may be eliminated, and some or all of its functionality may be provided by other ones of components 112, 114, 116, and/or 118. As another example, processor 108 may be configured to execute one or more additional components that may perform some or all of the functionality attributed herein to one of components 112, 114, 116, and/or 118.

Figure 6:
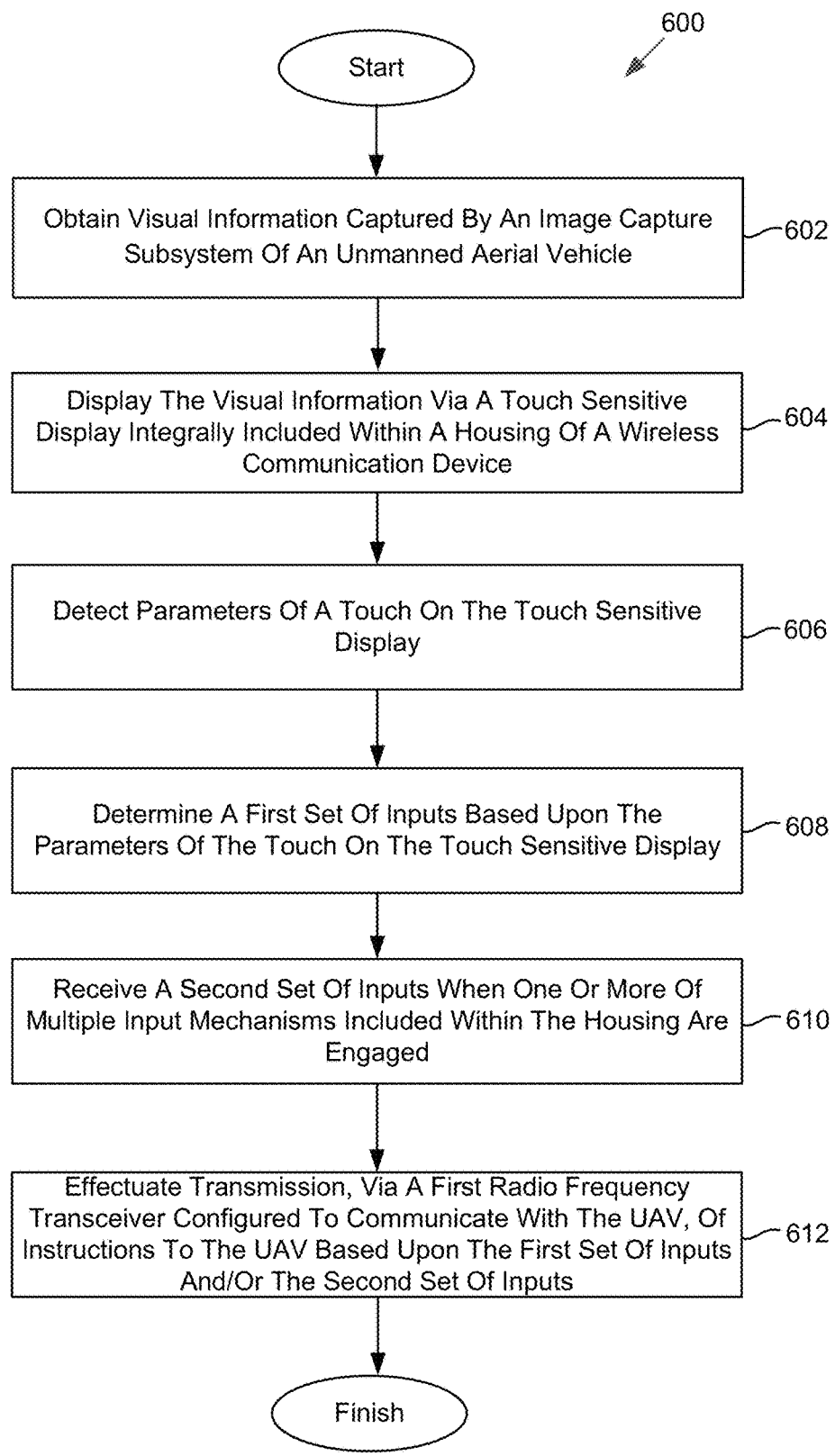
FIG. 6 illustrates a method for communicating with an unmanned aerial vehicle via a wireless communication device, in accordance with one or more implementations.

FIG. 6 illustrates a method 600 for communicating with a UAV via a wireless communication device, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, visual information captured by an image capture subsystem of the UAV may be obtained. Operation 602 may be performed by a visual information component that is the same as or similar to visual information component 112, in accordance with one or more implementations.

At an operation 604, the visual information may be displayed via a touch sensitive display integrally included within a housing of the wireless communication device. Operation 604 may be performed by a visual information component that is the same as or similar to visual information component 112, in accordance with one or more implementations.

At an operation 606, parameters of a touch may be detected on the touch sensitive display. Operation 606 may be performed by a touch parameters component that is the same as or similar to touch parameters component 114, in accordance with one or more implementations.

At an operation 608, a first set of inputs may be determined based upon the parameters of the touch on the touch sensitive display. Operation 608 may be performed by an inputs component that is the same as or similar to inputs component 116, in accordance with one or more implementations.

At an operation 610, a second set of inputs may be received when one or more of multiple input mechanisms included within the housing of the wireless communication device are engaged. Operation 610 may be performed by an inputs component that is the same as or similar to inputs component 116, in accordance with one or more implementations.

At an operation 612, instructions may be transmitted, via a first radio frequency transceiver configured to communicate with the UAV, to the UAV based upon the first set of inputs and/or the second set of inputs. Operation 612 may be performed by a transmission component that is the same as or similar to transmission component 118 in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A wireless communication device, the device comprising:
   a housing;
   a touch sensitive display integrally included within the housing;
   multiple radio frequency transceivers included within the housing, wherein a first radio frequency transceiver communicates with an unmanned aerial vehicle and a second radio frequency transceiver communicates with a network;
   multiple input mechanisms included with the housing that are physically engageable for manual manipulation by a user separate from manipulation of the housing; and
   a processor included within the housing, wherein the processor is configured to:
      obtain, via the first radio frequency transceiver, visual information captured by an image capture subsystem of the unmanned aerial vehicle;
      display the visual information via the touch sensitive display;
      detect parameter values of parameters of a touch on the touch sensitive display, the parameter values of the touch including a location value specifying a location of the touch on the touch sensitive display and/or a pressure value specifying a pressure of the touch on the touch sensitive display;
      determine a first set of inputs based upon the parameter values of the parameters of the touch on the touch sensitive display;
      receive a second set of inputs when one or more of the multiple input mechanisms are physically engaged; and
      effectuate transmission, via the first radio frequency transceiver, of instructions to the unmanned aerial vehicle based upon the first set of inputs and/or the second set of inputs, the instructions being configured to adjust flight controls and/or adjust the image capture subsystem of the unmanned aerial vehicle.

2. The wireless communication device of claim 1, wherein the second radio frequency transceiver communicates with the network via a Wi-Fi protocol.

3. The wireless communication device of claim 1, wherein a third radio frequency transceiver communicates with other wireless communication devices and/or multi-purpose devices.

4. The wireless communication device of claim 3, wherein the third radio frequency transceiver communicates with other wireless communication devices and/or multi-purpose devices via a Bluetooth protocol.

5. The wireless communication device of claim 3, wherein the third radio frequency transceiver communicates with other wireless communication devices and/or multi-purpose devices via a Wi-Fi protocol.

6. The wireless communication device of claim 3, wherein the processor is further configured to:
   effectuate transmission, via the third radio frequency, of information to other wireless communication devices and/or multi-purpose devices based upon the first set of inputs and/or the second set of inputs.

7. The wireless communication device of claim 1, wherein the processor is further configured to:
   receive, via the second radio frequency, one or more updates for the wireless communication device and/or the unmanned aerial vehicle.

8. The wireless communication device of claim 7, wherein the processor is further configured to:
   effectuate transmission, via the first radio frequency, of the one or more updates for the unmanned aerial vehicle to the unmanned aerial vehicle.

9. The wireless communication device of claim 1, wherein the instructions being configured to adjust flight controls include instructions to adjust one or more of an altitude, a longitude, a latitude, a geographical location, a heading, and/or a speed of the unmanned aerial vehicle.

10. The wireless communication device of claim 1, wherein the instructions being configured to adjust the image capture subsystem include instructions to adjust a gimbal, one or more of an aperture timing, an exposure, a focal length, an angle of view, a depth of field, a focus, a light metering, a white balance, a resolution, a frame rate, an object of focus, a capture angle, a zoom parameter, a video format, a sound parameter, and/or a compression parameter of the image capture subsystem.

11. A method to communicate with an unmanned aerial vehicle via a wireless communication device, the method comprising:
   obtaining, via the first radio frequency transceiver, visual information captured by an image capture subsystem of the unmanned aerial vehicle;
   displaying the visual information via a touch sensitive display integrally included within a housing of the wireless communication device;
   detecting parameter values of parameters of a touch on the touch sensitive display, the parameter values of the touch including a location value specifying a location of the touch on the touch sensitive display and/or a pressure value specifying a pressure of the touch on the touch sensitive display;
   determining a first set of inputs based upon the parameter values of the parameters of the touch on the touch sensitive display;

receiving a second set of inputs when one or more of multiple input mechanisms are physically engaged, the multiple input mechanisms being included with the housing and being physically engageable for manual manipulation by a user separate from manipulation of the housing; and effectuate transmission, via a first radio frequency transceiver configured to communicate with the unmanned aerial vehicle, of instructions to the unmanned aerial vehicle based upon the first set of inputs and/or the second set of inputs, the instructions being configured to adjust flight controls and/or adjust the image capture subsystem of the unmanned aerial vehicle;

wherein the wireless communication device includes multiple radio frequency transceivers within the housing, the multiple radio frequency transceivers including a second radio frequency transceiver that communicates with a network.

12. The method of claim 11, wherein the second radio frequency transceiver communicates with the network via a Wi-Fi protocol.

13. The method of claim 11, wherein a third radio frequency transceiver communicates with other wireless communication devices and/or multi-purpose devices.

14. The method of claim 13, wherein the third radio frequency transceiver communicates with other wireless communication devices and/or multi-purpose devices via a Bluetooth protocol.

15. The method of claim 13, wherein the third radio frequency transceiver communicates with other wireless communication devices and/or multi-purpose devices via a Wi-Fi protocol.

16. The method of claim 13, further comprising:

effectuate transmission, via the third radio frequency, of information to other wireless communication devices and/or multi-purpose devices based upon the first set of inputs and/or the second set of inputs.

17. The method of claim 11, further comprising:

receiving, via the second radio frequency, one or more updates for the wireless communication device and/or the unmanned aerial vehicle.

18. The method of claim 17, further comprising:

effectuate transmission, via the first radio frequency, of the one or more updates for the unmanned aerial vehicle to the unmanned aerial vehicle.

19. The method of claim 11, wherein the instructions being configured to adjust flight controls include instructions to adjust one or more of an altitude, a longitude, a latitude, a geographical location, a heading, and/or a speed of the unmanned aerial vehicle.

20. The method of claim 11, wherein the instructions being configured to adjust the image capture subsystem include instructions to adjust one or more of a gimbal, an aperture timing, an exposure, a focal length, an angle of view, a depth of field, a focus, a light metering, a white balance, a resolution, a frame rate, an object of focus, a capture angle, a zoom parameter, a video format, a sound parameter, and/or a compression parameter of the image capture subsystem.

* * * * *